Figures 1, 2:
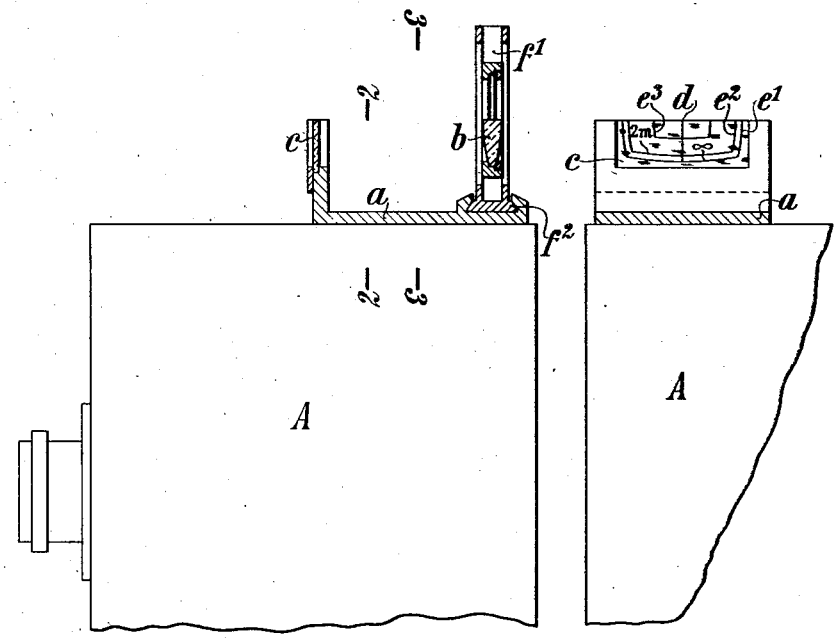

Feb. 8, 1927. 1,616,723
E. WANDERSLEB
FINDER FOR PHOTOGRAPHIC APPARATUS
Filed Aug. 13, 1921 2 Sheets-Sheet 1

Inventor:

Feb. 8, 1927. 1,616,723
E. WANDERSLEB
FINDER FOR PHOTOGRAPHIC APPARATUS
Filed Aug. 13, 1921   2 Sheets-Sheet 2

Inventor:

Patented Feb. 8, 1927.

1,616,723

UNITED STATES PATENT OFFICE.

ERNST WANDERSLEB, OF JENA, GERMANY, ASSIGNOR TO THE FIRM CARL ZEISS, OF JENA, GERMANY.

FINDER FOR PHOTOGRAPHIC APPARATUS.

Application filed August 13, 1921, Serial No. 492,116, and in Germany April 6, 1915.

(GRANTED UNDER THE PROVISIONS OF THE ACT OF MARCH 3, 1921, 41 STAT. L., 1313.)

The present invention consists in the use and modification of a known arrangement, the collimator, as a finder for photographic apparatus. In its simplest form a collimator consists of a collective lens combined with a sighting mark (usually in the focus of the said lens) and fulfils the purpose of presenting to an eye located behind the lens or to another optical system a virtual image of the sighting mark, lying at a certain, usually infinite distance. If such a collimator be combined with a photographic apparatus, a finder is obtained, by means of which the centre of the image to be photographed can be fixed.

The practical construction and further modification of such a finder depends on two possibilities: In the first case the collimator is made as a half lens, so that the field of view is divided into two parts and an eye placed behind the collimator receives as to one half the pencils of light emerging from the collimator and as to the other half those coming from the object viewed; in the second case the collimator has an entire lens and the observer employs both eyes, projecting the image of the mark, presented to one eye in the field of view of the collimator onto the objects lying in front of the other, free viewing eye.

In both cases the value of the finder may be considerably enhanced, by fixing, by means of marks or lines, in a plane approximately coinciding with the focal plane of the collimator lens angular dimensions, which bear a relation to the size of the image produced by the apparatus. As compared with the finder constructions in use heretofore this has the advantage, that the accurate limiting of the size of the image is effected on the object to be photographed itself, that the image plane is seen, so to speak, in its natural size.

In the case of the collimator with a half lens it is possible by means of marks, which are arranged along the straight line separating the free field of view and the field of view of the collimator, to fix angular dimensions, which correspond with the image extent of the apparatus used in the direction parallel to the straight line bounding the half lens at various distances of the object and with the objective focal lengths employed, so that to an observer, whose eye receives as to one half the pencils of light emerging from the collimator and as to one half those coming from the object viewed, the size of angle corresponding to the said image extent will appear to be transferred to the object viewed. The finder will be preferably combined with the photographic apparatus in such a manner that the straight line bounding the half lens will be parallel to one of the bounding edges of the plate, so that the image width or the image height is cut out on the objects viewed. It may also be advisable, to combine the finder with the apparatus movably in such a manner that the straight line bounding the half lens can at will be placed parallel to the image breadth or the image height. The extent of the image can also be fixed in the direction perpendicular to the straight line bounding the lens, by arranging in the field of view of the collimator in the plane containing the marks or lines further marks or lines, which bound a plane corresponding to half the size of the image produced by the apparatus, so that an observer, whose eye again receives as to one half the pencils of light emerging from the collimator and as to one half those coming from the objects viewed, can by estimating a surface in the free field of view, of the same size as and contiguous to the bounded surface in the field of view of the collimator, judge, what part of the objects will be imaged on the plate.

If the collimator be intended for use with both eyes, i. e., is provided with a whole lens, it will be possible in this case as well to fix, by means of marks or lines in a plane coinciding approximately with the focal plane of the collimator lens, angular dimensions, which correspond to the size of the image produced by the apparatus at various object distances and to the objective focal lengths employed, so that an observer looking into the collimator with one eye can project these angular dimensions onto the objects presented to the other free viewing eye and thereby cuts out of the field of view of the free viewing eye the angular space, an image of which is formed on the plate.

Both with the finder intended for use with one eye and with that intended for use with both eyes, it is possible to employ no more than marks fixing the limits of the image field and to do without a fixing of the middle part of the image.

The collimator may be provided besides with marks, which fix the middle or the limits of the image field, with a scale, which shows for different distances the angle under which an object of a certain size will appear. As a means of comparison, for instance, the average size of a man or the diameter of a balloon of usual capacity will be chosen. Such a scale can consist of a number of images of the object used for comparison which are of different sizes and each of which corresponds to a different distance.

The angular dimension corresponding to the size of the image in each case is dependent on the distance of the objects to be photographed from the apparatus, but the total variation of these angular limits is in general relatively small. Hence in most cases it will be sufficient, if one does not limit himself altogether to the case of the infinitely distant object, to fix the angular dimension of the size of the image in the field in view of the collimator to two or three objects distances only, comprising for instance the distance "infinity" and the least distance, with which the camera extension still allows work to be done. If the apparatus can be used for several focal lengths, the image fields may be separately fixed for each focal length.

A further possibility for adapting the size of image bounded by the finder to the distance of the object would be, not to fix for a series of object distances the corresponding angular dimensions in the plane of the marks of the finder, but to displace the mark carrier in the direction of the sighting axis with a single angular dimension, for instance that corresponding to infinity. As, however, in this case the ray pencils emerging from the collimator no longer have their rays parallel, the limited power of accommodation of the eye imposes relatively narrow limits for the possibility of using the method, unless the arrangement be adopted, which in practice is mostly too complicated, of constructing the collimator lens of two parts, the distance apart of which is variable.

The practical construction of a collimator may be carried out, as is well known, both with a half lens and with a whole lens, in various ways and hence a finder according to the invention may be variously constructed. A single or a composite lens with a mark carrier perpendicular to the axis of the lens may be used, while the marks may also be disposed on the front surface of the lens body, or in each case there can be also introduced between the lens and the mark carrier a reflecting surface, which deflects the sighting axis by about 90°.

If the collimator be made of a single lens, the figures disposed approximately in the focal plane of the lens will be presented to the eye in a distorted manner. This distortion may be compensated in a simple manner, by making the figures in the surface containing them with the opposite distortion, so that they will appear to the eye in the field of view of the collimator in their correct form. The surface, on which the figures are drawn, must, as stated above, be so chosen as approximately to coincide with the focal plane of the collimator lens (which will generally consist of two surfaces lying close together and touching one another). As a first approximation a plane plate, for instance a glass plate, may be used, which touches or cuts the focal plane; it may, however, be better in some cases, to mark the figures on a curved surface, adapted to the focal plane, for instance a curved plate of sheet metal. The figures themselves may be drawn either light on a dark ground or dark on a light ground, while in both cases the illumination may be such that the light falls on it or through it. Light figures on a dark ground can for instance be made, by letting them form perforations of a sheet, which is impervious to light. In special cases it may be preferable, to embody the figures by wires or the like stretched in a frame.

When photographing dark objects or photographing at night it may happen, that the figures in the field of view of the collimator can no longer be distinguished by the eye. For such purposes it is preferable, to illuminate the mark images in a known manner with a suitable source of light, for instance with a small electric lamp.

In the usual photographic apparatus the objective is generally disposed so as to be displaceable perpendicular to the optical axis, either only in one direction or in two directions perpendicular to one another. In order that with such a displacement of the objective the collimator finder may still bound the correct image field, it is necessary for one of its two component parts—lens or mark carrier—to be also displaced to an extent corresponding to the displacement of the objective perpendicularly to the sighting axis relatively to the other part. Hence, the two collimator parts will, corresponding to the manner in which the objective can be displaced, also be made displaceable relatively to one another either in one or in two directions perpendicular to one another, the amount of the displacement being preferably read on suitable scales.

Figure 3:
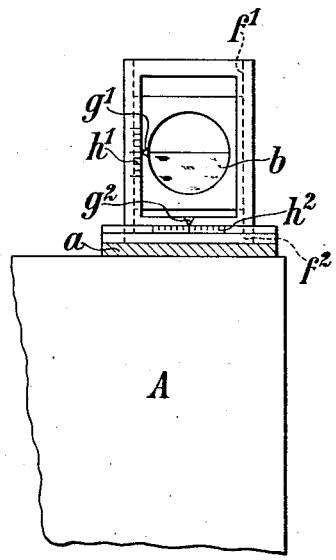
Figures 4, 5:
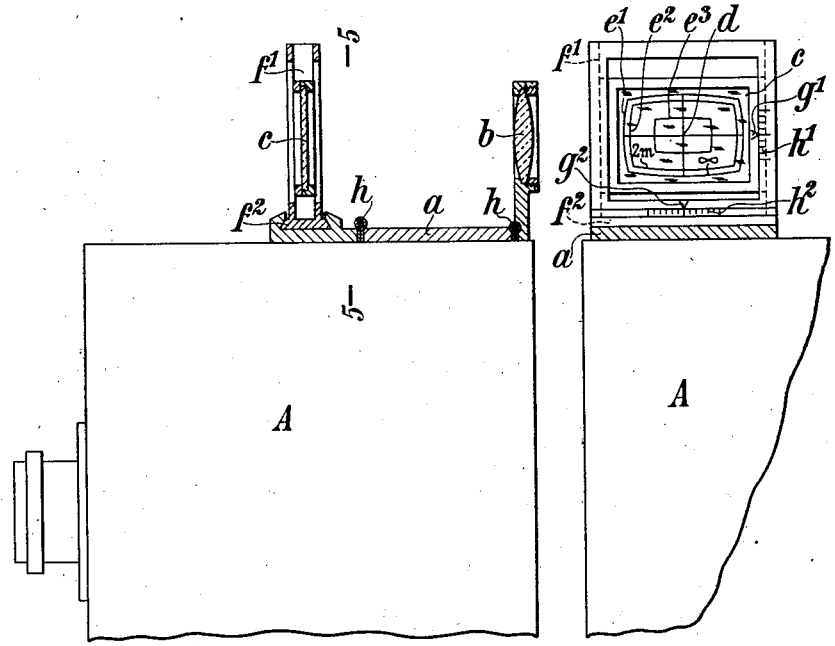
Figures 6, 7:
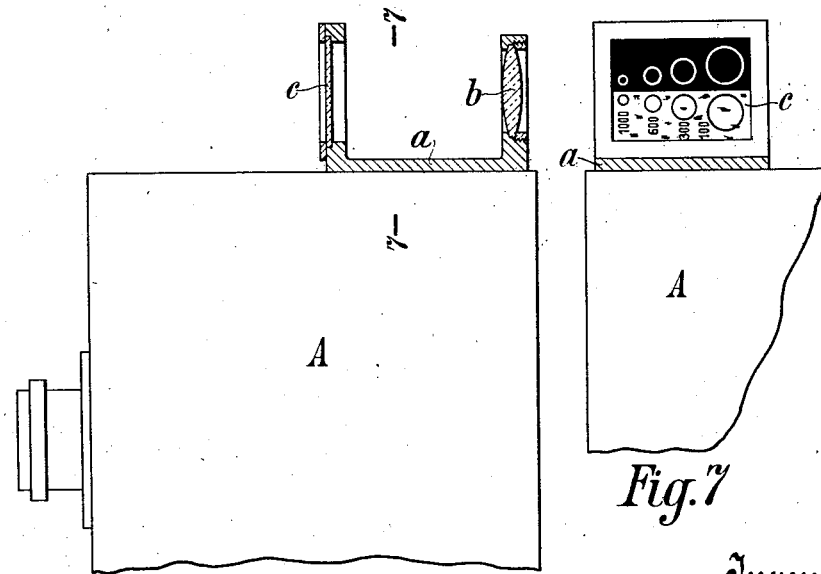

In the drawing the invention is illustrated by three constructional examples. Figs. 1 to 3 show in three sections a finder having a half lens; Figs. 4 and 5 show in two sections a foldable finder having an entire lens; Figs. 6 and 7 show in two sections a fixed finder having an entire lens.

In the first example (Figs. 1 to 3) on a bedplate marked $a$, by means of which the finder is fixed to the camera A, there is on one side a half lens $b$ and on the other side a plane mark carrier $c$, which is mounted in the focal plane of the lens. The mark carrier $c$ contains besides a mark $d$ fixing the sighting axis two framing lines $e^1$ and $e^2$ adjoining the straight bounding line between the free field of view and the field of view of the collimator and corresponding to half the size of the image of the camera used for the objective distances infinity and $2^m$, and also a smaller framing line $e^3$, which, assuming the camera objective to be symmetrical, corresponds to the angle covered by the back lens alone with an objective distance infinity. In view of the aberrations of the lens, the framing lines are drawn in such a manner that in the field of view of the collimator they appear as rectangles. The lens $b$ can by means of two guides $f^1$ and $f^2$ be displaced relatively to the sighting axis in two directions perpendicular to one another, for compensating a displacement of the objective relatively to the middle of the plate. The amount of the displacement in each case can be read off by means of two indices $g^1$ and $g^2$ and two corresponding scales $h^1$ and $h^2$.

In the second example (Figs. 4 and 5) the separate parts have the same references as in Figs. 1 to 3; the only difference being, that the framing lines $e^1$, $e^2$ and $e^3$ now correspond in each case to the entire image. In this case the two guides $f^1$ and $f^2$ are fitted on the mark carrier $c$ and the lens and the mark carrier can be laid over by means of hinges $h$.

In the third example (Figs. 6 and 7) the lens $b$ of the collimator is rigidly fixed to a bedplate $a$, also a mark carrier $c$. The frame of the mark carrier forms in this case the limit of the image field. The mark carrier is blackened in its upper half, while in its lower half it is transparent. In each half it is provided with a series of circles, which, getting smaller and smaller, correspond to a spherical balloon of a certain diameter at different distances. At each circle the corresponding distance is marked.

I claim:

1. In a finder for photographic apparatus a collimator consisting of a semi-lens and pairs of marks disposed in a plane approximately coinciding with the focal plane of the lens along the straight boundary line between the free field of view of the said collimator, the said pairs of marks lying symmetrically to the axis of the said semi-lens, thus being adapted to delimit the size of the image to be produced in the direction parallel to the said boundary line for different object-distances.

2. In a finder for photographic apparatus a collimator consisting of a semi-lens and pairs of marks disposed in a plane approximately coinciding with the focal plane of the lens along the straight boundary line between the free field of view and the field of view of the said collimator, the said pairs of marks lying symmetrically to the axis of the said semi-lens, thus being adapted to delimit the size of the image to be produced in the direction parallel to the said boundary line for different focal lengths of the photographic apparatus to be used.

3. In a finder for photographic apparatus a collimator lens and a plurality of mark systems disposed in a plane approximately coinciding with the focal plane of the lens, these systems being of different size and surrounding each other, thus being adapted to delimit the size of the image to be produced for different object-distances.

4. In a finder for photographic apparatus a collimator lens and a plurality of mark systems disposed in a plane approximately coinciding with the focal plane of the lens, these systems being of different size and surrounding each other, thus being adapted to delimit the size of the image to be produced for different focal lengths of the photographic apparatus to be used.

5. In a finder for photographic apparatus a single collimator lens and marks disposed in a plane approximately coinciding with the focal plane of the lens, the said marks forming rectangles of different size surrounding each other, the sides of the said rectangles being slightly curved outwardly for compensating the distortion caused by the said single lens of the images of the said rectangles presented to the observer.

6. In a finder for photographic apparatus a collimator lens and a plurality of marks disposed in a plane approximately coinciding with the focal plane of the said lens, the said marks lying around the axis of the said lens, thus being adapted to delimit the field of the image to be taken.

ERNST WANDERSLEB.